(12) United States Patent
Masunishi et al.

(10) Patent No.: US 11,169,035 B2
(45) Date of Patent: Nov. 9, 2021

(54) PRESSURE SENSOR

(71) Applicant: KABUSHIKI KAISHA TOSHIBA, Tokyo (JP)

(72) Inventors: Kei Masunishi, Kawasaki Kanagawa (JP); Naofumi Nakamura, Setagaya Tokyo (JP); Hiroaki Yamazaki, Yokohama Kanagawa (JP); Tomohiro Saito, Yokohama Kanagawa (JP); Fumitaka Ishibashi, Kawasaki Kanagawa (JP); Yoshihiko Kurui, Chigasaki Kanagawa (JP); Tomohiko Nagata, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 84 days.

(21) Appl. No.: 16/789,748

(22) Filed: Feb. 13, 2020

(65) Prior Publication Data
US 2021/0041311 A1 Feb. 11, 2021

(30) Foreign Application Priority Data
Aug. 7, 2019 (JP) .............................. JP2019-145104

(51) Int. Cl.
*G01L 1/14* (2006.01)
*G01L 1/20* (2006.01)
*G01L 9/00* (2006.01)

(52) U.S. Cl.
CPC ................ *G01L 1/148* (2013.01); *G01L 1/20* (2013.01); *G01L 9/0047* (2013.01); *G01L 9/0073* (2013.01)

(58) Field of Classification Search
CPC .......... G01L 1/148; G01L 1/20; G01L 9/0047; G01L 9/0073
See application file for complete search history.

(56) References Cited

U.S. PATENT DOCUMENTS 5,257,542 A * 11/1993 Voss ...................... G01L 9/0075
29/25.41
2006/0038798 A1 * 2/2006 Katsuki ................. G06F 3/0436
345/177

(Continued)

FOREIGN PATENT DOCUMENTS

JP  2015-52532 A   3/2015
JP  6132047 B1    5/2017

*Primary Examiner* — Max H Noori
(74) *Attorney, Agent, or Firm* — Finnegan, Henderson, Farabow, Garrett & Dunner L.L.P.

(57) ABSTRACT

According to one embodiment, a pressure sensor includes a base body, a supporter, a film part, a first electrode, and a second electrode. The supporter is fixed to the base body. The film part is separated from the base body. The film part includes first, second, and third partial regions, and a rim portion. The rim portion is supported by the supporter. The second partial region is between the first partial region and the rim portion. The third partial region is between the second partial region and the rim portion. The first electrode is provided between the base body and the first partial region and between the base body and the second partial region. The first electrode is fixed to the base body. The second electrode is provided between the first electrode and the first partial region and between the first electrode and the second partial region.

20 Claims, 7 Drawing Sheets

(56) References Cited

U.S. PATENT DOCUMENTS

| | | | |
|---|---|---|---|
| 2008/0150563 A1* | 6/2008 | Sanada | G01R 1/07314 |
| | | | 324/750.03 |
| 2014/0168538 A1* | 6/2014 | Kim | G06F 3/0445 |
| | | | 349/12 |
| 2015/0068314 A1 | 3/2015 | Nakamura et al. | |
| 2016/0258824 A1* | 9/2016 | Fuji | G01B 7/24 |
| 2019/0064961 A1* | 2/2019 | Isoda | B32B 27/302 |
| 2019/0301956 A1 | 10/2019 | Tanaka et al. | |

* cited by examiner

PRESSURE SENSOR

CROSS-REFERENCE TO RELATED APPLICATIONS

This application is based upon and claims the benefit of priority from Japanese Patent Application No. 2019-145104, filed on Aug. 7, 2019; the entire contents of which are incorporated herein by reference.

FIELD

Embodiments described herein relate generally to a pressure sensor.

BACKGROUND

For example, there is a pressure sensor utilizing a MEMS structure. Stable characteristics of the pressure sensor are desirable.

DETAILED DESCRIPTION

Figure 1A:
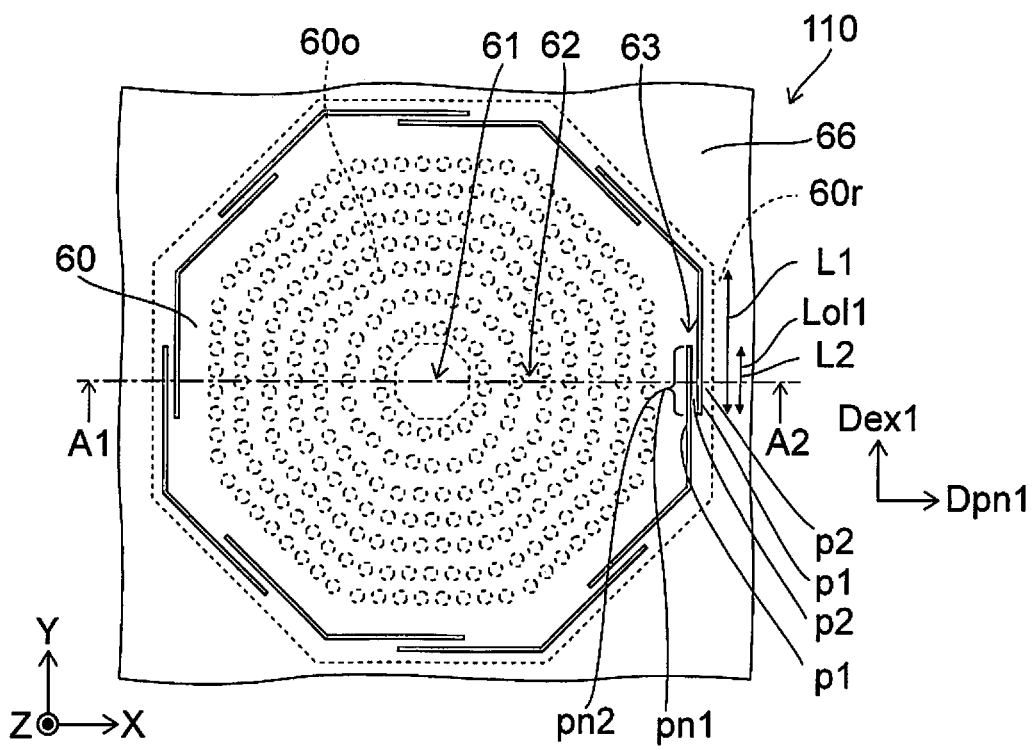
FIG. 1A and FIG. 1B are schematic plan views illustrating a pressure sensor according to a first embodiment.

According to one embodiment, a pressure sensor includes a base body, a supporter, a film part, a first electrode, and a second electrode. The supporter is fixed to the base body. The film part is separated from the base body in a first direction. The film part includes a first partial region, a second partial region, a third partial region, and a rim portion. The rim portion is supported by the supporter. The second partial region is between the first partial region and the rim portion in a second direction crossing the first direction. The third partial region is between the second partial region and the rim portion in the second direction. The first electrode is provided between the base body and the first partial region and between the base body and the second partial region. The first electrode is fixed to the base body. The second electrode is provided between the first electrode and the first partial region and between the first electrode and the second partial region. A first gap is between the first electrode and the second electrode. The second electrode includes a first electrode region and a second electrode region. The first electrode region is fixed to the first partial region. A second gap is between the second electrode region and the second partial region. The base body, the supporter, and the film part airtightly maintain a space where the first electrode and the second electrode are provided. The third partial region includes a first portion and a second portion. A first thickness along the first direction of the first portion is thinner than a second thickness along the first direction of the second portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
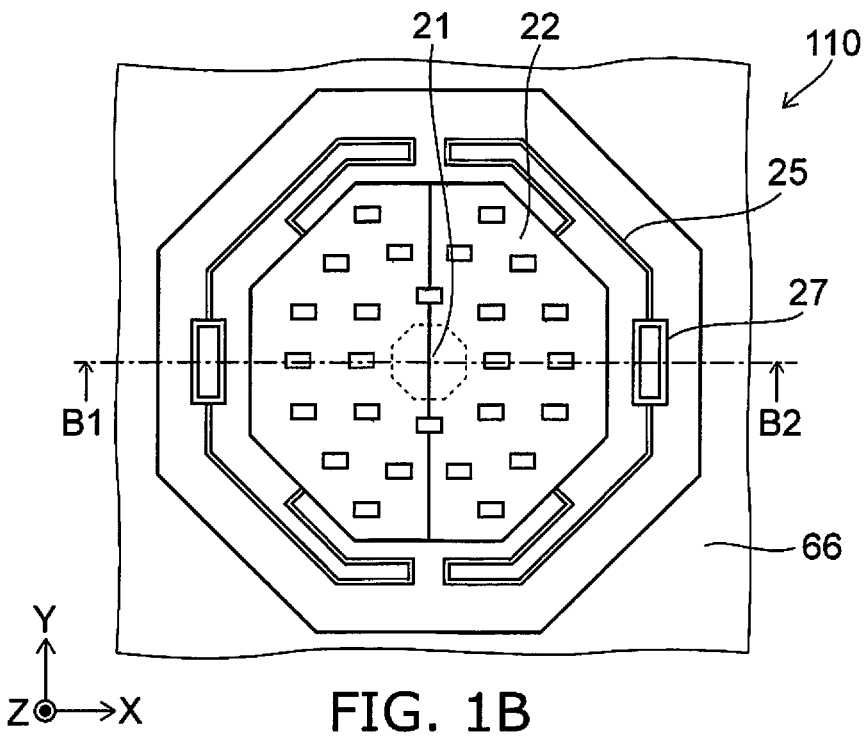

FIG. 1A and FIG. 1B are schematic plan views illustrating a pressure sensor according to a first embodiment.

Figure 2A:
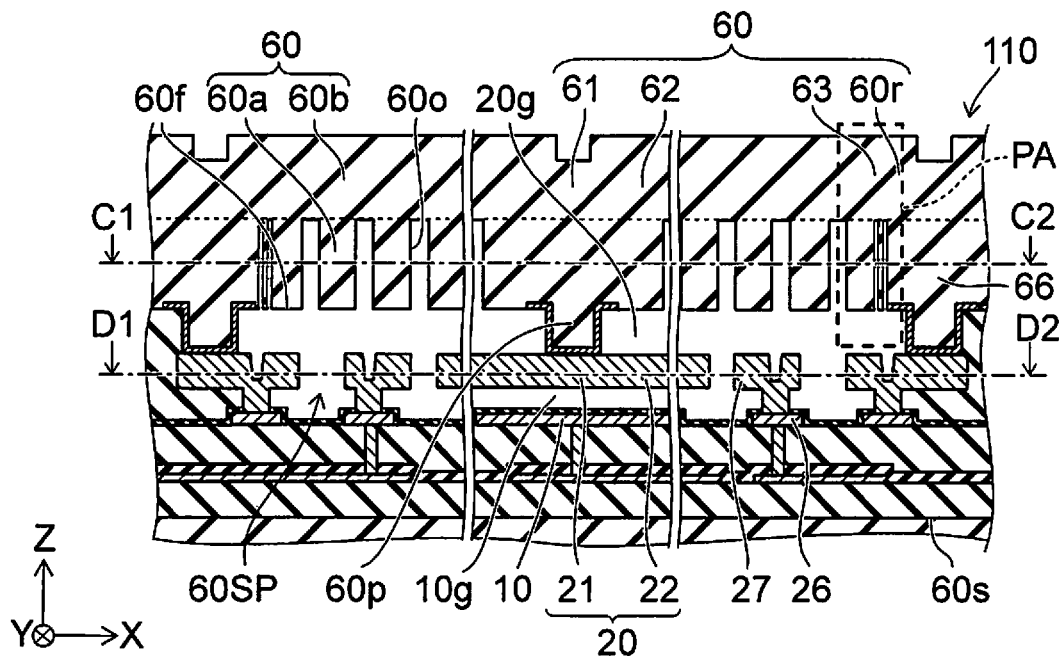
FIG. 2A and FIG. 2S are schematic cross-sectional views illustrating the pressure sensor according to the first embodiment.
Figure 2B:
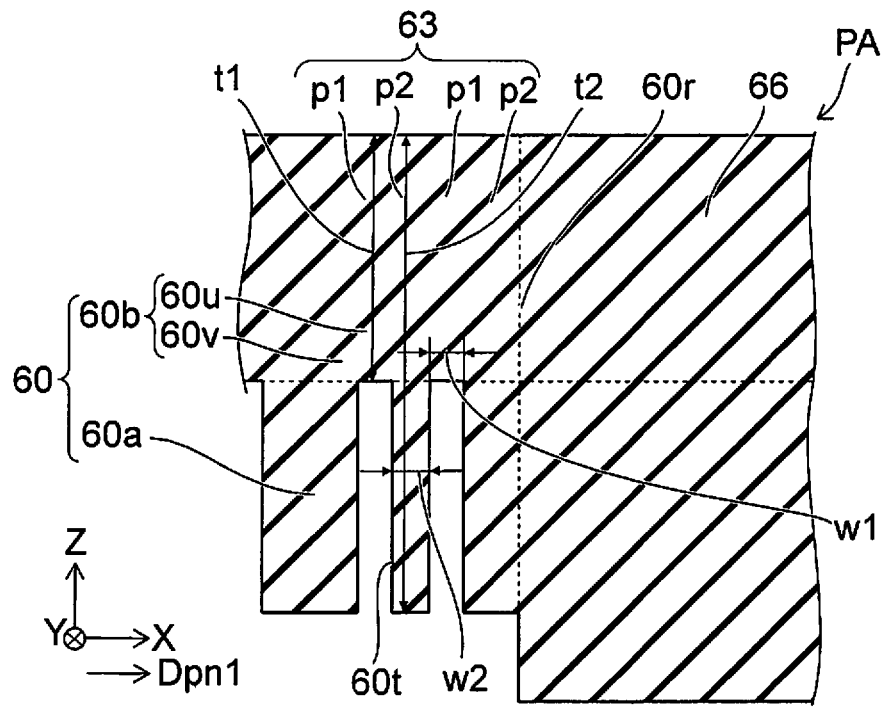

FIG. 2A and FIG. 2B are schematic cross-sectional views illustrating the pressure sensor according to the first embodiment.

FIG. 1A is a plan view corresponding to a cross section along line C1-C2 of FIG. 2A. FIG. 1B is a plan view corresponding to a cross section along line D1-D2 of FIG. 2A. FIG. 2A is a cross-sectional view along line A1-A2 of FIG. 1A and line B1-B2 of FIG. 1B. FIG. 2B is an enlarged view of portion PA of FIG. 2A.

As shown in FIG. 2A, the pressure sensor 110 according to the embodiment includes a base body 60s, a supporter 66, a film part 60, a first electrode 10, and a second electrode 20. The supporter 66 is fixed to the base body 60s. The base body 60s is, for example, a substrate. The base body 60s may include, for example, a silicon substrate, etc.

The film part 60 is separated from the base body 60s in a first direction. The first direction is taken as a Z-axis direction. One direction perpendicular to the Z-axis direction is taken as an X-axis direction. A direction perpendicular to the Z-axis direction and the X-axis direction is taken as a Y-axis direction.

For example, the film part 60 spreads along the X-Y plane. The outer edge of the film part 60 is supported by the supporter 66. A space 60SP is surrounded with the base body 60s, the supporter 66, and the film part 60. A gap (the space 60SP) is provided between the base body 60s and the film part 60. For example, the space 60SP is in a reduced-pressure state. For example, the pressure of the space 60SP is less than 1 atmosphere.

As shown in FIG. 2A and FIG. 1A, the film part 60 includes a first partial region 61, a second partial region 62, a third partial region 63, and a rim portion 60r. The rim portion 60r is supported by the supporter 66.

The second partial region 62 is between the first partial region 61 and the rim portion 60r in a second direction crossing the first direction (the Z-axis direction). The third partial region 63 is between the second partial region 62 and the rim portion 60r in the second direction. The second direction is, for example, one direction in the X-Y plane. The second direction is, for example, the X-axis direction. The first partial region 61, the second partial region 62, the third partial region 63, and the rim portion 60r are continuous with each other. The boundaries of these regions may be indistinct.

As shown in FIG. 2A, the first electrode 10 is provided between the base body 60s and the first partial region 61 and between the base body 60s and the second partial region 62. The first electrode 10 is fixed to the base body 60s.

As shown in FIG. 2A, the second electrode 20 is provided between the first electrode 10 and the first partial region 61 and between the first electrode 10 and the second partial region 62. A first gap 10g is between the first electrode 10 and the second electrode 20.

As shown in FIG. 2A and FIG. 1B, the second electrode 20 includes a first electrode region 21 and a second electrode region 22. The first electrode region 21 is fixed to the first partial region 61. For example, a protrusion 60p is provided at a portion of the film part 60 corresponding to the first partial region 61. The first electrode region 21 is suspended from the protrusion 60p.

For example, the direction from the first electrode region 21 toward the second electrode region 22 is aligned with the second direction recited above. For example, the second electrode region 22 is continuous with the first electrode region 21. A second gap 20g is between the second electrode region 22 and the second partial region 62. The region that overlaps the second gap 20g corresponds to the second electrode region 22.

The first electrode 10 and the second electrode 20 are provided in the space 60SP. The base body 60s, the supporter 66, and the film part 60 airtightly maintain the space 60SP where the first electrode 10 and the second electrode 20 are provided.

FIG. 1B is a plan view corresponding to a cross section along the X-Y plane including the second electrode 20. The second electrode 20 is connected to a connection portion 25. A portion of the connection portion 25 is connected to an anchor portion 27. The anchor portion 27 is connected to a second electrode wiring 26. The connection portion 25 is, for example, a spring. For example, the connection portion 25 is deformable.

A capacitance is formed between the first electrode 10 and the second electrode 20. For example, a value corresponding to the electrostatic capacitance of the capacitance can be detected by detecting an electrical signal between the first electrode 10 and the second electrode wiring 26.

For example, the film part 60 deforms when pressure is applied to the pressure sensor 110. For example, a portion of the film part 60 is displaced along the Z-axis direction. According to the deformation of the film part 60, the distance between the first electrode 10 and the second electrode 20 changes, and the electrostatic capacitance changes. The applied pressure can be detected by detecting the electrical signal between the first electrode 10 and the second electrode wiring 26.

In the embodiment, the second electrode 20 includes the second electrode region 22. Because the outer edge portion (the second electrode region 22) of the second electrode 20 is separated from the film part 60, the second electrode 20 easily maintains a state along the X-Y plane substantially independent of the displacement distribution along the Z-axis direction of the film part 60. For example, the second electrode 20 easily moves parallel along the Z-axis direction. High sensitivity is obtained thereby.

For example, there is a first reference example in which the entire second electrode 20 (or a major portion of the second electrode 20) contacts the film part 60. When the pressure is applied to the film part 60 in the first reference example, the film part 60 does not deform easily due to the rigidity of the second electrode 20. Therefore, it is difficult to sufficiently increase the sensitivity in the first reference example. Also, in the first reference example, the second electrode 20 deforms according to the deformation of the film part 60 when the film part 60 deforms. For example, the change of the distance between the first electrode 10 and the second electrode 20 is different between the first partial region 61 and the rim portion 60r. For example, the change of the distance at a position corresponding to the rim portion 60r is small. Therefore, it is difficult to sufficiently increase the sensitivity in the first reference example.

In the embodiment, the film part 60 deforms easily because the second electrode region 22 of the second electrode 20 is separated from the film part 60. A higher sensitivity is obtained thereby. Also, in the embodiment, the second electrode 20 maintains a state along the X-Y plane substantially independent of the displacement distribution along the Z-axis direction of the film part 60; for example, the second electrode 20 easily moves parallel along the Z-axis direction. The distance changes greatly even at the position corresponding to the rim portion 60r. The distance changes over a large surface area. A higher sensitivity is obtained thereby.

Generally, film stress easily remains in the film part 60 when the film part 60 is formed on a sacrificial layer when manufacturing. There are cases where the film part 60 deforms in a convex configuration due to the film stress when the sacrificial layer is removed. In the first reference example recited above, a conductive film that is used to form the second electrode 20 is stacked on the film part 60. The deformation of the film part 60 due to the film stress generated in the film part 60 can be relaxed by correcting the film stress, the thickness, and the like of the conductive film. Therefore, the film stress of the film part 60 does not become problematic easily in the first reference example.

As shown in FIG. 2A, the surface of the film part 60 opposing the base body 60s is taken as a first surface 60f. In the embodiment, the second electrode 20 (the first electrode region 21) is provided at a region (the protrusion 60p) of a portion of the first surface 60f; and a film that is used to form an electrode is not provided in the other regions. Therefore, it is difficult to adjust the film stress of the film part 60 by using the film used to form the second electrode 20.

In such a case, in the embodiment, a special structure is provided in which the effects of the film stress in the film part 60 can be relaxed. Namely, for example, as shown in FIG. 2B, multiple trenches 60t are provided at the vicinity of the outer edge of the film part 60; and the peripheral region of the trenches 60t deforms easily. Thereby, the deformation of the film part 60 can be suppressed even when the film stress is generated in the film part 60. A pressure sensor that has stable characteristics can be provided thereby. For example, even when the film part 60 in which film stress exists is formed, the stress can be relaxed by in-plane (X-Y plane) rotational displacement. For example, the deformation of the film part 60 in the first direction (the Z-axis direction) can be suppressed.

For example, as shown in FIG. 1A and FIG. 2B, the third partial region 63 includes a first portion p1 and a second portion p2. As shown in FIG. 2B, a first thickness t1 along the first direction (the Z-axis direction) of the first portion p1 is thinner than a second thickness t2 along the first direction of the second portion p2.

For example, because the thickness of the first portion p1 is thin, the first portion p1 and the peripheral region of the first portion p1 deform easily compared to the other regions. For example, in the state in which the film part 60 in which film stress exists is formed and the film part 60 deforms easily in the convex configuration, the deformation of the film part 60 in the Z-axis direction can be converted into a deformation in the X-Y plane by providing the first portion p1 and the peripheral region of the first portion p1. The deformation of the film part 60 in the Z-axis direction can be suppressed thereby. For example, high sensitivity is obtained in a wide range of manufacturing conditions even when the second electrode 20 (the first electrode region 21) is provided at a region (the protrusion 60p) of a portion of the first surface 60f, and a film that is used to form an electrode is not provided in the other regions.

Multiple first portions p1 may be provided. For example, the second portion p2 is provided between one of the multiple first portions p1 and another one of the multiple first portions p1. Multiple first portions p1 may be provided; and multiple second portions p2 may be provided. In such a case, one of the multiple second portions p2 is provided between one of the multiple first portions p1 and another one of the multiple first portions p1. Also, the one of the multiple first portions p1 is provided between the one of the multiple second portions p2 and another one of the multiple second portions p2.

For example, the second thickness t2 of the second portion p2 may be the same as the thickness along the Z-axis direction of the second partial region 62. For example, the second thickness t2 of the second portion p2 may be the same as the thickness along the Z-axis direction of the first partial region 61.

As shown in FIG. 1A, at least a portion of the first portion p1 extends along a first extension direction Dex1. The first extension direction Dex1 is along a first plane (e.g., the X-Y plane) crossing the first direction (the Z-axis direction). The length along the first extension direction Dex1 of the at least a portion of the first portion p1 recited above is taken as a first length L1 (referring to FIG. 1A). The length in a first cross direction Dpn1 of the at least a portion of the first portion p1 recited above is taken as a first width w1 (referring to FIG. 2B). The first cross direction Dpn1 is along the first plane (e.g., the X-Y plane) and crosses the first extension direction Dex1. For example, the first cross direction Dpn1 is perpendicular to the first extension direction Dex1. The first length L1 is longer than the first width w1.

As shown in FIG. 1A, the first portion p1 includes a portion pni overlapping the second portion p2 in the first cross direction Dpn1. The length along the first extension direction Dex1 of the portion pn1 overlapping the second portion p2 is taken as a length Lol1. The length Lol1 is, for example, not less than the first width w1. The length Lol1 is, for example, not more than the first length L1.

As described above, when the multiple first portions p1 are provided, the second portion p2 is provided between one of the multiple first portions p1 and another one of the multiple first portions p1. In such a case, at least a portion of the one of the multiple first portions p1 extends along the first extension direction Dex1. The first extension direction Dex1 is along the first plane (e.g., the X-Y plane) crossing the first direction. The length along the first extension direction Dex1 of at least a portion of the one of the multiple first portions p1 recited above is the first length L1. The length in the first cross direction Dpn1 of the at least a portion of the one of the multiple first portions p1 recited above is taken as the first width w1. The first length L1 is longer than the first width w1. The first cross direction Dpn1 is along the first plane and crosses the first extension direction Dex1. For example, the first cross direction Dpn1 is perpendicular to the first extension direction Dex1.

As shown in FIG. 1A, the second portion p2 includes a portion pn2 overlapping the first portion p1 in the first cross direction Dpn1. The length in the first extension direction Dex1 of the portion pn2 of the second portion p2 overlapping the first portion p1 is taken as a second length L2 (referring to FIG. 1A). The length in the first cross direction Dpn1 of the portion pn2 of the second portion p2 overlapping the first portion p1 is taken as a second width w2 (referring to FIG. 2B). The second length L2 is longer than the second width w2.

In the embodiment, for example, the second length L2 is not less than 2 times and not more than 1000 times the second width w2. For example, the effects of the film stress are suppressed easily because the second length L2 is not less than 2 times the second width w2. For example, good strength is easier to obtain because the second length L2 is not more than 1000 times the second width w2.

In the embodiment, the first length L1 is not less than 2 times and not more than 1000 times the first width w1. For example, the effects of the film stress are suppressed easily because the first length L1 is not less than 2 times the first width w1. For example, good strength is easier to obtain because the first length L1 is not more than 1000 times the first width w1.

In the embodiment, the first thickness t1 is, for example, not less than ⅒ of the second thickness t2. Thereby, for example, good strength is easier to obtain. For example, good sealability is easier to obtain at openings 60o and the trenches 60t. The first thickness t1 is not more than ⅘ of the second thickness t2. Thereby, for example, the effects of the film stress are suppressed easily.

As shown in FIG. 1A, for example, at least a portion of the first portion p1 extends along at least a portion of the rim portion 60r. At least a portion of the second portion p2 extends along at least a portion of the rim portion 60r.

As shown in FIG. 2A and FIG. 2B, the film part 60 includes a first film 60a and a second film 60b. The first film 60a is between the second film 60b and the base body 60s. The first film 60a has the trenches 60t. The second film 60b includes a portion 60u and a portion 60v. The portion 60u corresponds to the trench 60t in the first direction (the Z-axis direction). The portion 60v does not overlap the trench 60t in the first direction (the Z-axis direction). The portion 60u of the second film 60b corresponding to the trench 60t corresponds to the first portion p1. The first film 60a and the portion 60v of the second film 60b not overlapping the trench 60t correspond to the second portion p2. For example, a thin first portion p1 corresponds to a recess (the trench 60t) provided in the first surface 60f of the film part 60.

The material of the first film 60a may be the same as the material of the second film 60b. For example, the material of the first film 60a and the material of the second film 60b are silicon. For example, the material of the first film 60a and the material of the second film 60b are amorphous silicon. The material of the first film 60a may be different from the material of the second film 60b.

An example of a method for manufacturing the pressure sensor 110 will now be described. For example, the first electrode 10 is formed on the base body 60s. A first sacrificial layer is formed on the first electrode 10. The second electrode 20 is formed on the first sacrificial layer. A second sacrificial layer is formed on the second electrode 20. The first film 60a is formed on the second sacrificial layer. For example, the openings 60o are formed in the first film 60a (referring to FIG. 1A and FIG. 2A). The trenches 60t also are formed at this time. The first sacrificial layer and the second sacrificial layer are removed via the openings 60o and the trenches 60t. The first gap 10g and the second gap 20g are formed thereby. Subsequently, the second film 60b is formed. The second film 60b plugs the openings 60o and the trenches 60t. The pressure sensor 110 is formed thereby.

For example, the first film 60a easily deforms in a convex configuration due to the film stress of the compression generated in the first film 60a when the first film 60a recited above is formed.

In the embodiment, the deformation in the Z-axis direction of the first film 60a can be suppressed by providing the trenches 60t. A flat first film 60a is obtained easily. Because the second film 60b is formed on the flat first film 60a, the second film 60b also becomes flat easily. As a result, a flat film part 60 is obtained easily.

An example of the effects of the film stress of the first film 60a will now be described.

Figure 3A:
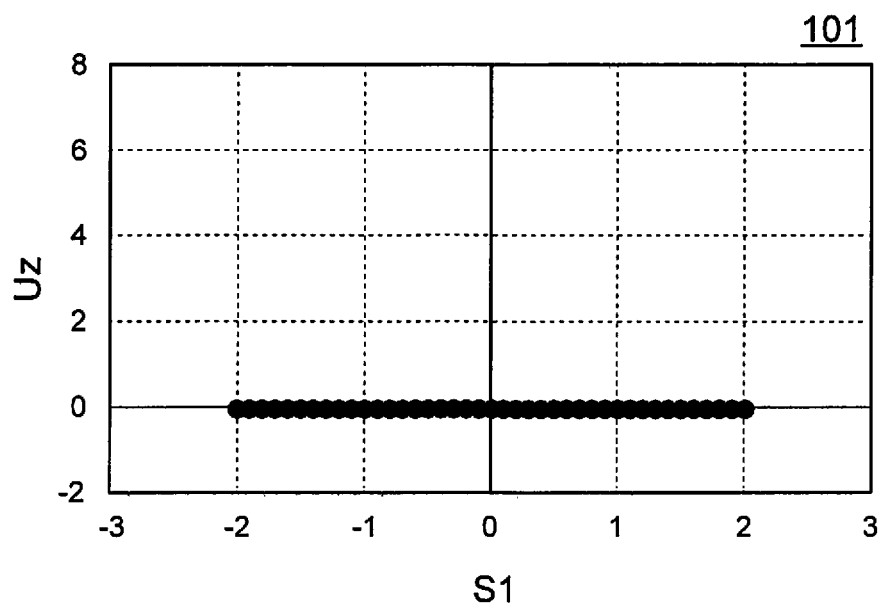
FIG. 3A and FIG. 3B are graphs illustrating characteristics of the pressure sensor.
Figure 3B:
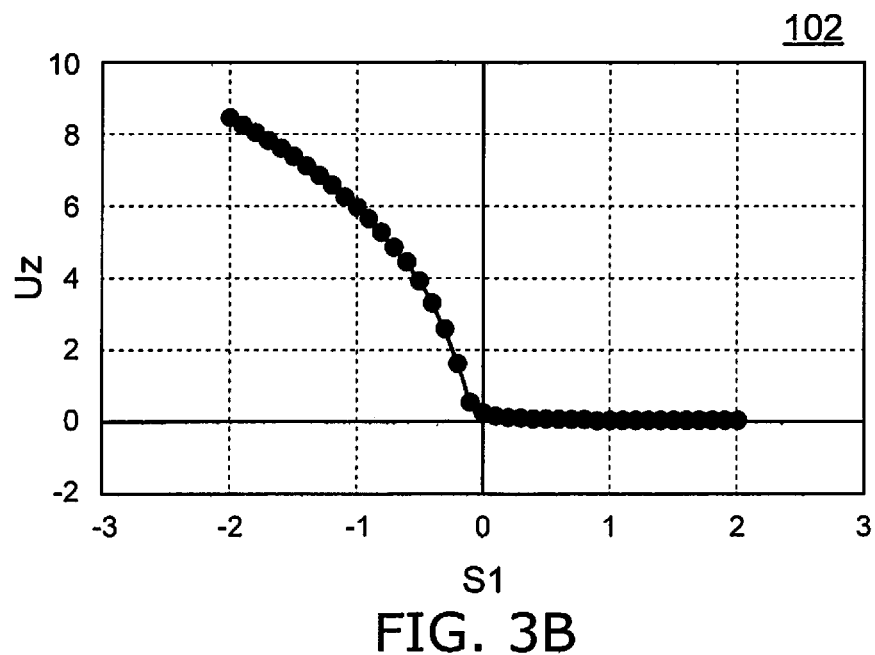

FIG. 3A and FIG. 3B are graphs illustrating characteristics of the pressure sensor.

These figures show an example of simulation results relating to the pressure sensor. FIG. 3A corresponds to a first model 101; and FIG. 3B corresponds to a second model 102. In the first model 101 and the second model 102, the first film 60a is supported by the supporter 66. The first model 101 corresponds to the pressure sensor 110 according to the embodiment. In the pressure sensor 110, the trenches 60t are provided, and the first portion p1 and the second portion p2 are provided. The second model 102 corresponds to a second reference example. In the second model 102, the trenches 60t are not provided, and the first portion p1 and the second portion p2 are not provided. Otherwise, the configuration of the second model 102 is similar to that of the first model 101. In FIG. 3A and FIG. 3B, the horizontal axis is film stress S1 (arbitrary units) of the first film 60a. A positive film stress S1 corresponds to tensile stress. A negative film stress corresponds to compressive stress. In these figures, the vertical axis is a displacement Uz (arbitrary units) in the Z-axis direction at the position of the center of the first film 60a. The film stress S1 is the film stress of the first film 60a before the sacrificial layer is removed.

In the second model 102 as shown in FIG. 3B, the displacement Uz is substantially 0 when the film stress S1 is positive. In the second model 102, when the film stress S1 is negative, the displacement Uz increases as the absolute value of the film stress S1 increases. Thus, the first film 60a deforms in a convex configuration due to the film stress S1.

In the first model 101 as shown in FIG. 3A, the film stress S1 is substantially 0 when the film stress S1 is positive and negative. It is considered that in the first model 101, the film stress S1 which causes the displacement Uz in the Z-axis direction is relaxed by the trenches 60t (the first portion p1 and the second portion p2). For example, it is considered that the film stress S1 is relaxed by the first film 60a rotating in the X-Y plane.

According to the embodiment, the effects of the film stress of the film part 60 can be suppressed. According to the embodiment, a pressure sensor that has stable characteristics can be provided.

For example, in the manufacturing processes, the second sacrificial layer is formed at the portion corresponding to the second gap 20g between the second electrode region 22 and the second partial region 62, and the first film 60a is formed on the second sacrificial layer. The first film 60a is obtained by removing the second sacrificial layer via the openings 60o and the trenches 60t. A special structure (e.g., the trenches 60t) is provided in which the effects of the stress in the first film 60a can be relaxed. The peripheral region of the trenches 60t deforms easily as a spring. Thereby, even when the first film 60a is formed to have compressive film stress, the stress can be relaxed by the in-plane (X-Y plane) rotational displacement; and the deformation of the first film 60a in the first direction (the Z-axis direction) can be suppressed. The second film 60b is formed to plug the openings 60o and the trenches 60t; and the pressure sensor 110 is formed.

Figure 4A:
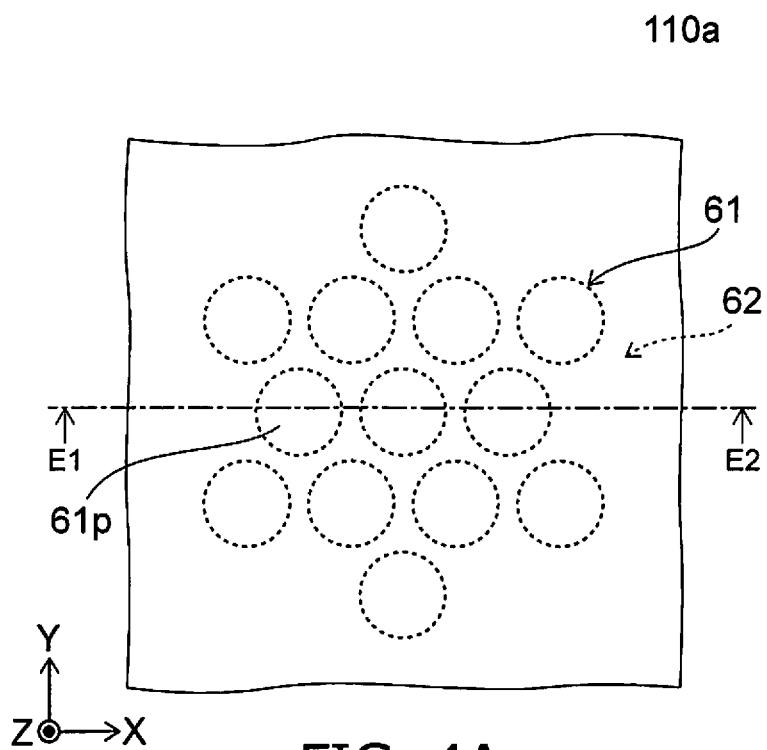
FIG. 4A and FIG. 4S are schematic views illustrating a pressure sensor according to the first embodiment.
Figure 4B:
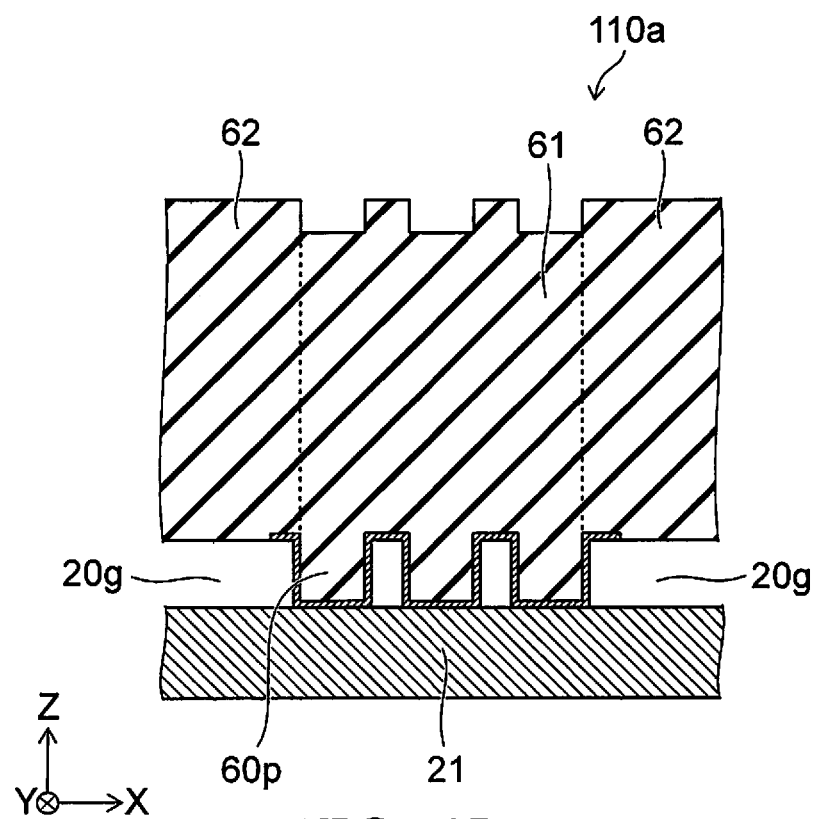

FIG. 4A and FIG. 4B are schematic views illustrating a pressure sensor according to the first embodiment.

FIG. 4A is a plan view. FIG. 4B is a line E1-E2 cross-sectional view of FIG. 4A. FIG. 4A and FIG. 4B illustrate the protrusion 60p corresponding to the first partial region 61. As in the pressure sensor 110a shown in FIG. 4A, multiple protrusions 60p may be provided. The region where the multiple protrusions 60p are provided corresponds to the first partial region 61. The region around the multiple protrusions 60p corresponds to the second partial region 62.

Figure 5:
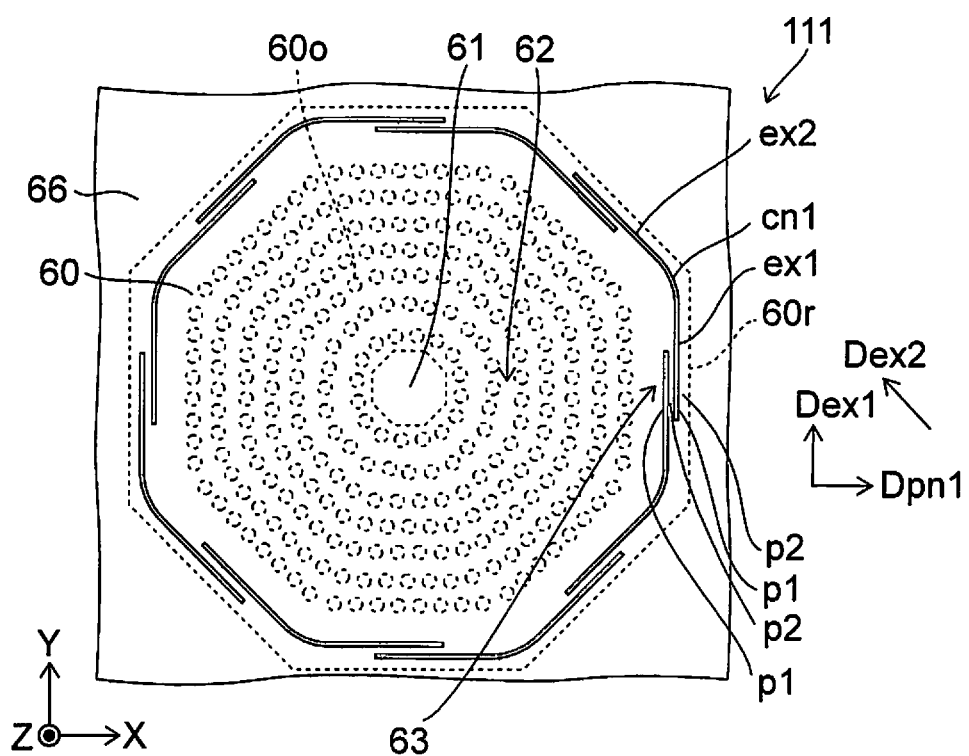
FIG. 5 is a schematic plan view illustrating a pressure sensor according to the first embodiment.

FIG. 5 is a schematic plan view illustrating a pressure sensor according to the first embodiment.

FIG. 5 is a plan view corresponding to a cross section along line C1-C2 of FIG. 2A.

In the pressure sensor 111 according to the embodiment as shown in FIG. 5, the first portion p1 includes a first extension portion ex1, a second extension portion ext, and a connection portion cn1. The first extension portion ex1 extends along the first extension direction Dex1. The first extension direction Dex1 is one direction along the first plane (X-Y) crossing the first direction (the Z-axis direction). The second extension portion ex2 extends along a second extension direction Dex2. The second extension direction Dex2 is along the first plane (the X-Y plane) and crosses the first extension direction Dex1. In the example, the angle between the first extension direction Dex1 and the second extension direction Dex2 is 45 degrees. The connection portion cn1 connects the first extension portion ex1 to the second extension portion ex2. Otherwise, the configuration of the pressure sensor 111 may be similar to the configuration of the pressure sensor 110.

As shown in FIG. 5, the connection portion cn1 has a curvilinear configuration (or a curved-surface configuration). Because the connection portion cn1 has a curvilinear configuration, the film stress of the film part 60 can be relaxed more easily.

Figure 6:
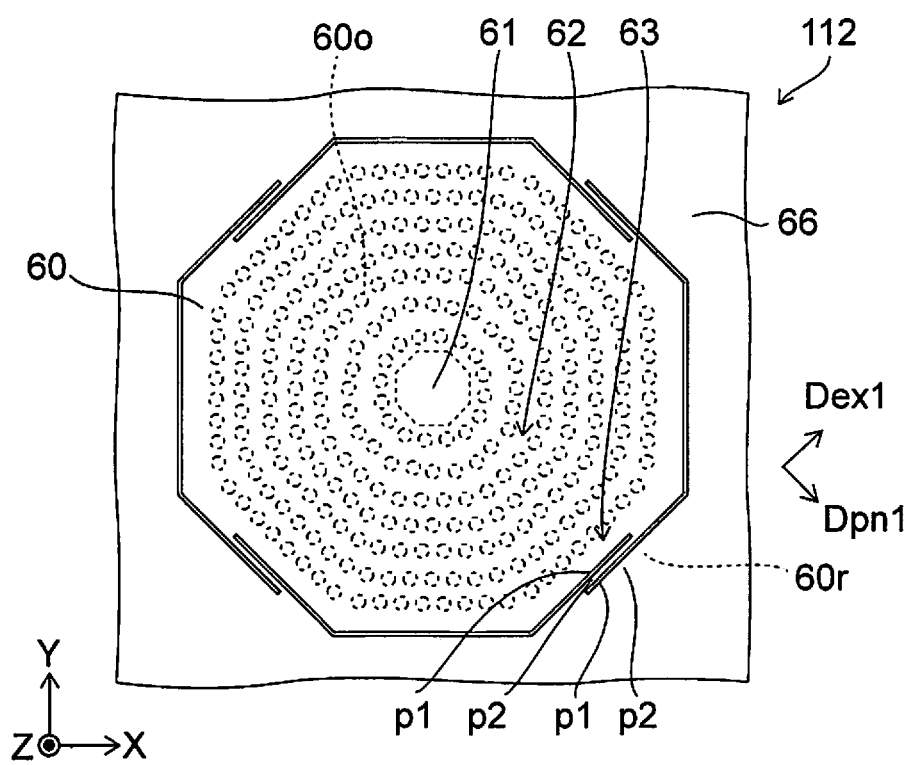
FIG. 6 is a schematic plan view illustrating a pressure sensor according to the first embodiment.

FIG. 6 is a schematic plan view illustrating a pressure sensor according to the first embodiment.

FIG. 6 is a plan view corresponding to a cross section along line C1-C2 of FIG. 2A. The first portion p1 and the second portion p2 are provided also in the pressure sensor 112 according to the embodiment as shown in FIG. 6. Various modifications are possible for the number of sets including the first portion p1 and the second portion p2.

Figure 7:
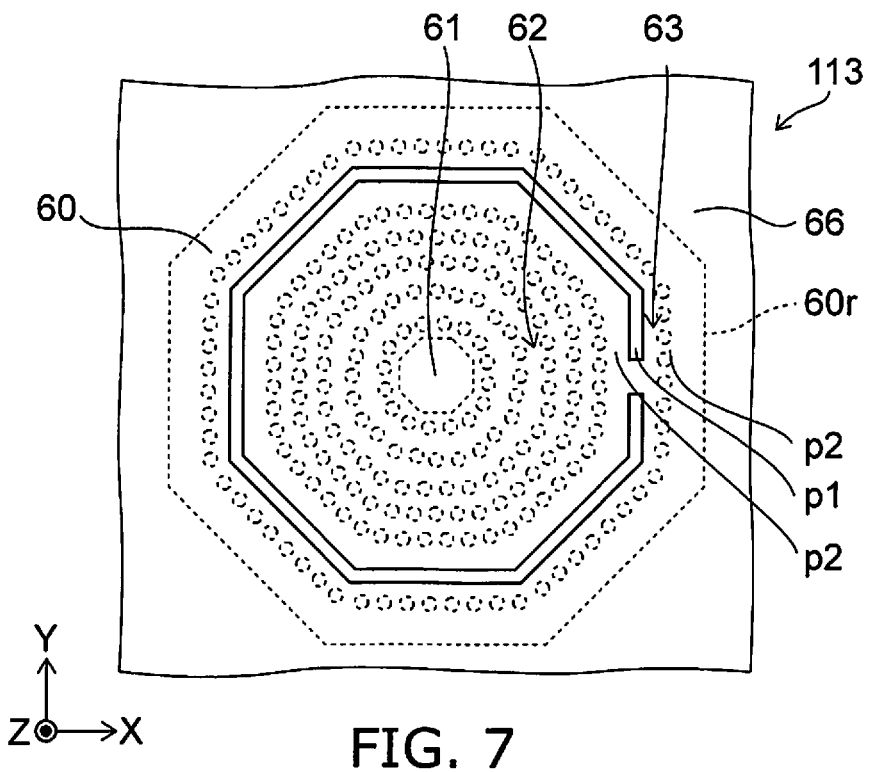
FIG. 7 is a schematic plan view illustrating a pressure sensor according to the first embodiment.

FIG. 7 is a schematic plan view illustrating a pressure sensor according to the first embodiment.

FIG. 7 is a plan view corresponding to a cross section along line C1-C2 of FIG. 2A. The first portion p1 and the second portion p2 are provided also in the pressure sensor 113 according to the embodiment as shown in FIG. 7. The number of sets including the first portion p1 and the second portion p2 may be 1.

In the embodiment, the planar configuration of the film part 60 is, for example, substantially a polygon. The number of corners of the polygon is arbitrary. The planar configuration of the film part 60 may be substantially a circle.

In the embodiment, for example, the material of the film part 60 is different from the material of the second electrode 20. For example, the film part 60 includes silicon. In such a case, for example, the second electrode 20 includes at least one selected from the group consisting of a metal and polysilicon. For example, the film part 60 includes at least one selected from the group consisting of amorphous silicon, silicon nitride, and silicon oxide. For example, the second electrode 20 includes at least one selected from the group consisting of Al, Cu, Ti, Ni, Cr, Au, and polysilicon. The first electrode 10 includes, for example, at least one selected from the group consisting of Al, Cu, Ti, Ni, Cr, Au, and polysilicon.

Second Embodiment

Figure 8:
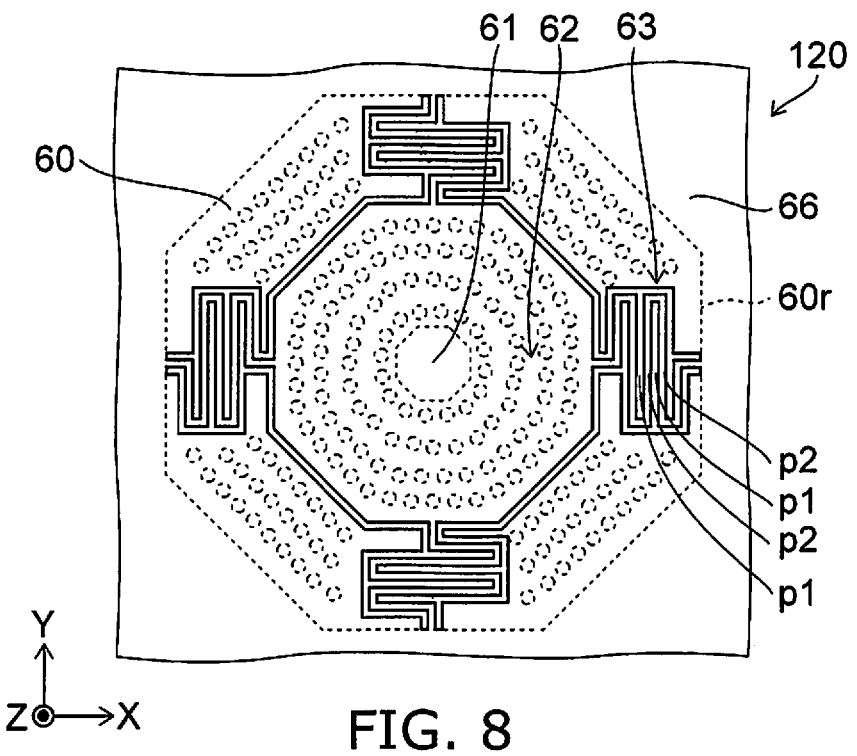
FIG. 8 is a schematic plan view illustrating a pressure sensor according to a second embodiment.

FIG. 8 is a schematic plan view illustrating a pressure sensor according to a second embodiment.

FIG. 8 is a plan view corresponding to a cross section along line C1-C2 of FIG. 2A. In the pressure sensor 120 according to the embodiment as shown in FIG. 8 as well, the first portion p1 and the second portion p2 are provided in the third partial region 63 of the film part 60. In the pressure sensor 120, the first portion p1 and the second portion p2 are at least a portion of a meandering structure. Otherwise, the configuration of the pressure sensor 120 may be similar to the configuration of the pressure sensor 110. Thus, the portion that is used as the spring may have a meandering structure. In the pressure sensor 120 as well, the effects of the film stress of the film part 60 can be relaxed; and the deformation of the film part 60 in the Z-axis direction can be suppressed. In the pressure sensor 120 as well, a pressure sensor that has stable characteristics can be provided.

Third Embodiment

Figure 9:
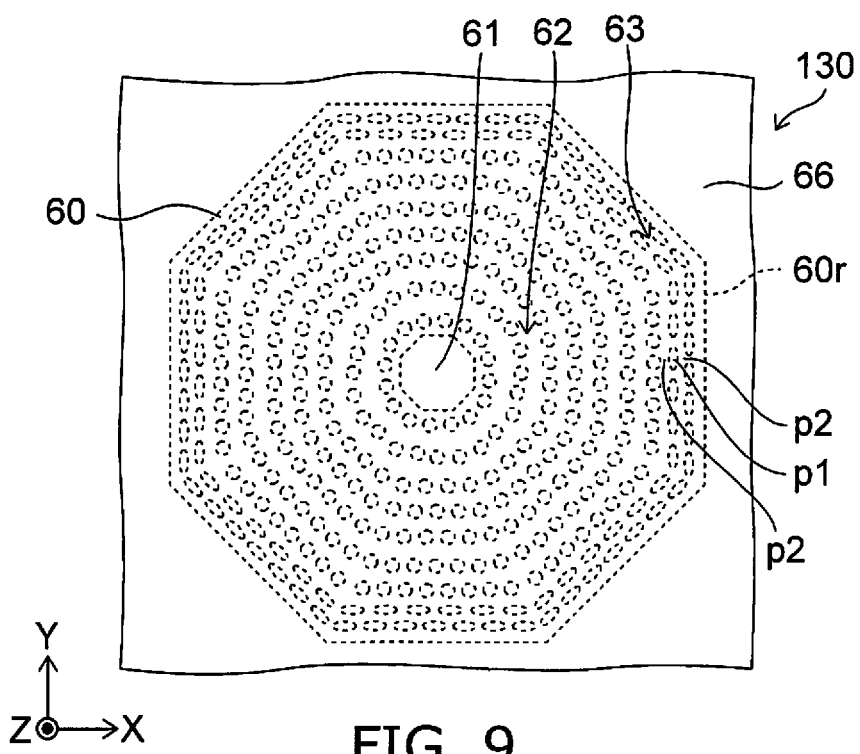
FIG. 9 is a schematic plan view illustrating a pressure sensor according to a third embodiment.

FIG. 9 is a schematic plan view illustrating a pressure sensor according to a third embodiment.

FIG. 9 is a plan view corresponding to a cross section along line C1-C2 of FIG. 2A. In the pressure sensor 130 according to the embodiment as shown in FIG. 9 as well, the first portion p1 and the second portion p2 are provided in the third partial region 63 of the film part 60. In the pressure sensor 130 as well, a pressure sensor that has stable characteristics can be provided. The first portion p1 is, for example, a flattened circle.

The embodiments may include the following configurations (e.g., technological proposals).

Configuration 1

A pressure sensor, comprising:
a base body;
a supporter fixed to the base body;
a film part separated from the base body in a first direction, the film part including a first partial region, a second partial region, a third partial region, and a rim portion, the rim portion being supported by the supporter, the second partial region being between the first partial region and the rim portion in a second direction crossing the first direction, the third partial region being between the second partial region and the rim portion in the second direction;
a first electrode provided between the base body and the first partial region and between the base body and the second partial region, the first electrode being fixed to the base body; and
a second electrode provided between the first electrode and the first partial region and between the first electrode and the second partial region, a first gap being between the first electrode and the second electrode, the second electrode including a first electrode region and a second electrode region, the first electrode region being fixed to the first partial region, a second gap being between the second electrode region and the second partial region, the base body, the supporter, and the film part airtightly maintaining a space where the first electrode and the second electrode are provided,
the third partial region including a first portion and a second portion, a first thickness along the first direction of the first portion being thinner than a second thickness along the first direction of the second portion.

Configuration 2

The pressure sensor according to Configuration 1, wherein a plurality of the first portions is provided, and the second portion is provided between one of the plurality of first portions and an other one of the plurality of first portions.

Configuration 3

The pressure sensor according to Configuration 1, wherein
a plurality of the first portions is provided,
a plurality of the second portions is provided,
one of the plurality of second portions is provided between one of the plurality of first portions and an other one of the plurality of first portions, and the one of the plurality of first portions is provided between the one of the plurality of second portions and an other one of the plurality of second portions.

Configuration 4

The pressure sensor according to any one of Configurations 1 to 3, wherein
at least a portion of the first portion extends along a first extension direction, the first extension direction being along a first plane crossing the first direction,
a first length along the first extension direction of the at least a portion of the first portion is longer than a first width in a first cross direction of the at least a portion of the first portion, and
the first cross direction is along the first plane and crosses the first extension direction.

Configuration 5

The pressure sensor according to Configuration 4, wherein the first length is not less than 2 times and not more than 1000 times the first width.

Configuration 6

The pressure sensor according to Configuration 4 or 5, wherein
a plurality of the first portions is provided, the second portion being provided between one of the plurality of first portions and an other one of the plurality of first portions,
at least a portion of the one of the plurality of first portions extends along a first extension direction, the first extension direction being along a first plane crossing the first direction,
a first length along the first extension direction of the at least a portion of the one of the plurality of first portions is longer than a first width in a first cross direction of the at least a portion of the one of the plurality of first portions,
the first cross direction is along the first plane and crosses the first extension direction,
the second portion includes a portion overlapping the first portion in the first cross direction, and
a second length in the first extension direction of the portion of the second portion overlapping the first portion is longer than a second width in the first cross direction of the portion of the second portion overlapping the first portion.

Configuration 7

The pressure sensor according to Configuration 6, wherein the second length is not less than 2 times and not more than 1000 times the second width.

Configuration 8

The pressure sensor according to Configuration 6 or 7, wherein the first portion includes a portion overlapping the second portion in the first cross direction, and a length along the first extension direction of the overlapping portion is not less than the first width and not more than the first length.

Configuration 9

The pressure sensor according to any one of Configurations 1 to 3, wherein at least a portion of the first portion extends along at least a portion of the rim portion.

Configuration 10

The pressure sensor according to Configuration 9, wherein at least a portion of the second portion extends along the at least a portion of the rim portion.

Configuration 11

The pressure sensor according to any one of Configurations 1 to 3, wherein the first portion and the second portion are at least a portion of a meandering structure.

Configuration 12

The pressure sensor according to any one of Configurations 1 to 11, wherein the first thickness is not less than $1/10$ of the second thickness.

Configuration 13

The pressure sensor according to any one of Configurations 1 to 12, wherein the first thickness is not more than $4/5$ of the second thickness.

Configuration 14

The pressure sensor according to any one of Configurations 1 to 3, wherein the first portion includes:

a first extension portion extending along a first extension direction, the first extension direction being along a first plane crossing the first direction;

a second extension portion extending along a second extension direction, the second extension direction being along the first plane and crossing the first extension direction; and a connection portion connecting the first extension portion to the second extension portion, and the connection portion has a curvilinear configuration.

Configuration 15

The pressure sensor according to any one of Configurations 1 to 14, wherein a material of the film part is different from a material of the second electrode.

Configuration 16

The pressure sensor according to any one of Configurations 1 to 15, wherein the film part includes silicon, and the second electrode includes at least one selected from the group consisting of a metal and polysilicon.

Configuration 17

The pressure sensor according to any one of Configurations 1 to 16, wherein the film part includes at least one selected from the group consisting of amorphous silicon, silicon nitride, and silicon oxide, and the second electrode includes at least one selected from the group consisting of Al, Cu, Ti, Ni, Cr, Au, and polysilicon.

Configuration 18

The pressure sensor according to any one of Configurations 1 to 17, wherein the film part includes a first film and a second film, the first film is between the second film and the base body, the first film has a trench, and the second film includes:

a portion corresponding to the trench in the first direction; and a portion not overlapping the trench in the first direction.

Configuration 19

The pressure sensor according to any one of Configurations 1 to 18, wherein a distance between the first electrode and the second electrode changes according to a deformation of the film part.

Configuration 20

The pressure sensor according to any one of Configurations 1 to 18, wherein an electrostatic capacitance between the first electrode and the second electrode changes according to a deformation of the film part.

According to the embodiments, a pressure sensor that has stable characteristics can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in pressure sensors such as base bodies, supporters, film parts, electrodes, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all pressure sensors practicable by an appropriate design modification by one skilled in the art based on the pressure sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A pressure sensor, comprising:

a base body;

a supporter fixed to the base body;

a film part separated from the base body in a first direction, the film part including a first partial region, a second partial region, a third partial region, and a rim portion, the rim portion being supported by the supporter, the second partial region being between the first partial region and the rim portion in a second direction crossing the first direction, the third partial region being between the second partial region and the rim portion in the second direction;

a first electrode provided between the base body and the first partial region and between the base body and the second partial region, the first electrode being fixed to the base body; and a second electrode provided between the first electrode and the first partial region and between the first electrode and the second partial region, a first gap being between the first electrode and the second electrode, the second electrode including a first electrode region and a second electrode region, the first electrode region being fixed to the first partial region, a second gap being between the second electrode region and the second partial region, the base body, the supporter, and the film part airtightly maintaining a space where the first electrode and the second electrode are provided, the third partial region including a first portion and a second portion, a first thickness along the first direction of the first portion being thinner than a second thickness along the first direction of the second portion.

2. The sensor according to claim 1, wherein
a plurality of the first portions is provided, and
the second portion is provided between one of the plurality of first portions and an other one of the plurality of first portions.

3. The sensor according to claim 1, wherein
a plurality of the first portions is provided,
a plurality of the second portions is provided,
one of the plurality of second portions is provided between one of the plurality of first portions and an other one of the plurality of first portions, and
the one of the plurality of first portions is provided between the one of the plurality of second portions and an other one of the plurality of second portions.

4. The sensor according to claim 1, wherein
at least a portion of the first portion extends along a first extension direction, the first extension direction being along a first plane crossing the first direction,
a first length along the first extension direction of the at least a portion of the first portion is longer than a first width in a first cross direction of the at least a portion of the first portion, and
the first cross direction is along the first plane and crosses the first extension direction.

5. The sensor according to claim 4, wherein the first length is not less than 2 times and not more than 1000 times the first width.

6. The sensor according to claim 4, wherein
a plurality of the first portions is provided, the second portion being provided between one of the plurality of first portions and an other one of the plurality of first portions,
at least a portion of the one of the plurality of first portions extends along a first extension direction, the first extension direction being along a first plane crossing the first direction,
a first length along the first extension direction of the at least a portion of the one of the plurality of first portions is longer than a first width in a first cross direction of the at least a portion of the one of the plurality of first portions,
the first cross direction is along the first plane and crosses the first extension direction,
the second portion includes a portion overlapping the first portion in the first cross direction, and
a second length in the first extension direction of the portion of the second portion overlapping the first portion is longer than a second width in the first cross direction of the portion of the second portion overlapping the first portion.

7. The sensor according to claim 6, wherein the second length is not less than 2 times and not more than 1000 times the second width.

8. The sensor according to claim 6, wherein
the first portion includes a portion overlapping the second portion in the first cross direction, and
a length along the first extension direction of the overlapping portion is not less than the first width and not more than the first length.

9. The sensor according to claim 1, wherein at least a portion of the first portion extends along at least a portion of the rim portion.

10. The sensor according to claim 9, wherein at least a portion of the second portion extends along the at least a portion of the rim portion.

11. The sensor according to claim 1, wherein the first portion and the second portion are at least a portion of a meandering structure.

12. The sensor according to claim 1, wherein the first thickness is not less than 1/10 of the second thickness.

13. The sensor according to claim 1, wherein the first thickness is not more than 4/5 of the second thickness.

14. The sensor according to claim 1, wherein
the first portion includes:
a first extension portion extending along a first extension direction, the first extension direction being along a first plane crossing the first direction;
a second extension portion extending along a second extension direction, the second extension direction being along the first plane and crossing the first extension direction; and
a connection portion connecting the first extension portion to the second extension portion, and
the connection portion has a curvilinear configuration.

15. The sensor according to claim 1, wherein a material of the film part is different from a material of the second electrode.

16. The sensor according to claim 1, wherein
the film part includes silicon, and
the second electrode includes at least one selected from the group consisting of a metal and polysilicon.

17. The sensor according to claim 1, wherein
the film part includes at least one selected from the group consisting of amorphous silicon, silicon nitride, and silicon oxide, and
the second electrode includes at least one selected from the group consisting of Al, Cu, Ti, Ni, Cr, Au, and polysilicon.

18. The sensor according to claim 1, wherein
the film part includes a first film and a second film,
the first film is between the second film and the base body,
the first film has a trench, and
the second film includes:
a portion corresponding to the trench in the first direction; and
a portion not overlapping the trench in the first direction.

19. The sensor according to claim 1, wherein a distance between the first electrode and the second electrode changes according to a deformation of the film part.

20. The sensor according to claim 1, wherein an electrostatic capacitance between the first electrode and the second electrode changes according to a deformation of the film part.

* * * * *